United States Patent
Ackerschewski et al.

(10) Patent No.: US 7,149,968 B1
(45) Date of Patent: Dec. 12, 2006

(54) METHOD FOR THE SIMULTANEOUS NON-OVERLAPPING REPRESENTATION OF AT LEAST TWO DATA VISUALIZATION WINDOWS IN A DISPLAY AREA OF A MONITOR OF A DATA PROCESSING INSTALLATION

(75) Inventors: Torsten Ackerschewski, Berlin (DE); Christian Peter Brandt, Berlin (DE); Steffen Kaiser, Weissenberg (DE); Otto Kueckmann, Berlin (DE); Stefan Schwabe, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/181,719

(22) PCT Filed: Jan. 21, 2000

(86) PCT No.: PCT/DE00/00225

§ 371 (c)(1),
(2), (4) Date: Jul. 22, 2002

(87) PCT Pub. No.: WO01/54113

PCT Pub. Date: Jul. 26, 2001

(51) Int. Cl.
G06F 17/00 (2006.01)
G06F 17/21 (2006.01)

(52) U.S. Cl. .................. 715/517; 715/788; 715/798

(58) Field of Classification Search ............. 715/517, 715/526, 790, 797, 788, 798; 345/418, 628, 345/635
See application file for complete search history.

(56) References Cited

U.S. PATENT DOCUMENTS

| | | | | |
|---|---|---|---|---|
| 5,060,170 | A * | 10/1991 | Bourgeois et al. | 715/788 |
| 5,377,317 | A * | 12/1994 | Bates et al. | 715/789 |
| 5,390,029 | A | 2/1995 | Wiliams et al. | 358/448 |
| 5,390,295 | A * | 2/1995 | Bates et al. | 715/789 |
| 5,487,143 | A * | 1/1996 | Southgate | 715/790 |
| 5,561,757 | A | 10/1996 | Southgate | 715/790 |
| 5,796,402 | A | 8/1998 | Ellison-Taylor | 715/792 |
| 5,880,725 | A | 3/1999 | Southgate | 715/790 |
| 5,880,733 | A * | 3/1999 | Horvitz et al. | 715/850 |
| 6,008,809 | A * | 12/1999 | Brooks | 715/792 |
| 6,016,145 | A * | 1/2000 | Horvitz et al. | 715/788 |
| 6,025,841 | A * | 2/2000 | Finkelstein et al. | 715/803 |
| 6,577,330 | B1 * | 6/2003 | Tsuda et al. | 715/782 |
| 6,750,858 | B1 * | 6/2004 | Rosenstein | 715/790 |

OTHER PUBLICATIONS

B. Bell et al., "Dynamic Space Management for User Interfaces," Proceedings of the 13th annual ACM symposium on User Interface software and technology, ACM, 2000, pp. 239-248.*

M. Lafon et al., "Reification, Polymorphism and Reuse: Three Principles for Designing Visual Interfaces," Proceedings of the Working Conference on Advanced Visual Intefaces, AVI 2000, Palermo, Italy, pp. 102-109.*

* cited by examiner

Primary Examiner—William Bashore
Assistant Examiner—Maikhanh Nguyen
(74) Attorney, Agent, or Firm—Morrison & Foerster LLP

(57) ABSTRACT

A method is provided for the simultaneous non-overlapping representation of at least further data visualization window in addition to a first established data visualization window in the display area of a monitor. The method allows arrangement of at least one further data visualization window in the display area of a monitor while maintaining the aspect ratio and the size thereof, beside a first data visualization window. Free rectangular areas of the first data visualization window are detected in the display area and are filed in a list with their characteristic data. The area of the free rectangular areas and their aspect ration and the aspect ration of the first data visualization window are taken into consideration for the determination of the optimizing variable. The additional data visualization window is positioned in the rectangular area with a priority in the derived list.

5 Claims, 1 Drawing Sheet

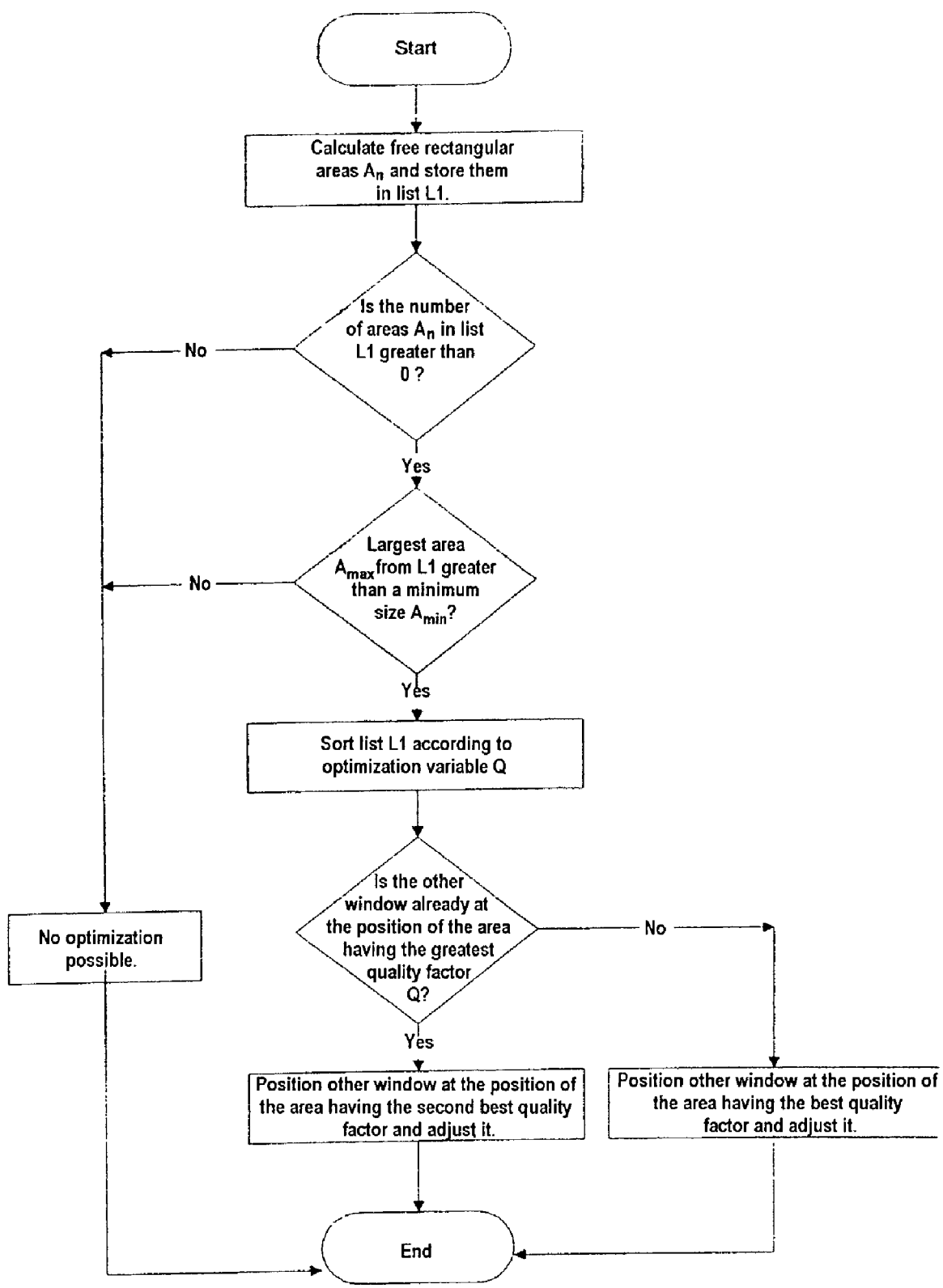

METHOD FOR THE SIMULTANEOUS NON-OVERLAPPING REPRESENTATION OF AT LEAST TWO DATA VISUALIZATION WINDOWS IN A DISPLAY AREA OF A MONITOR OF A DATA PROCESSING INSTALLATION

CLAIM FOR PRIORITY

This application is a national stage of PCT/DE00/00225 filed 21 Jan. 2000.

TECHNICAL FIELD OF THE INVENTION

The invention relates to a method for simultaneously displaying, at least one additional data visualization window, and in particular, a window having a prescribed area size and a prescribed aspect ratio with respect to at least one first existing data visualization window.

BACKGROUND OF THE INVENTION

Such a method is known generally and is performed in Microsoft's "Word" program following an "Arrange windows" command. In this case, this command is used to split the windows on a monitor's available display area evenly and symmetrically. The sizes of the individual data visualization windows are made uniform.

In many cases, however, this procedure is not what the respective user wants, because he frequently wishes to leave the size of the data visualization windows in particular aspect ratios according to his data visualization, and at the same time wishes to utilize the available display area in the best possible way in each case. To achieve this goal, the user is instructed to use the mouse, which involves him needing to use a complex procedure to move the individual edges of the data visualization windows with a plurality of subsequent corrections.

SUMMARY OF THE INVENTION

The invention discloses use of a command to position at least one additional data visualization window optimally next to at least one existing data visualization window on the display area of a monitor.

In one embodiment of the invention, there is a method for simultaneously displaying, at least one additional data visualization window, and in particular, a window having a prescribed area size and a prescribed aspect ratio with respect to at least one first existing data visualization window on the display area of a monitor in a data processing installation operated with window applications, in which the individual data visualization windows are positioned on the display area without overlap.

In another embodiment of the invention, there is a method for ascertaining rectangular areas on the display area which are free from the at least first data visualization window and storing them with their characteristic data in a list. The free rectangular areas are sorted by assessing their characteristic data using an optimization variable and producing a derived list, where an optimization variable is used which is calculated on the basis of the area size of the free rectangular areas and the aspect ratio of the free rectangular areas with respect to the aspect ratio of the at least one additional data visualization window. The additional data visualization window is placed in that rectangular area which is shown with priority in the derived list.

One advantage of the invention is that a command called "Optimize windows", for example, can be used to place at least one further data visualization window automatically in an optimally suited free rectangle on the display area of a monitor next to at least one already existing data visualization window, taking into account the additional data visualization window's dimensions. In this case, the dimensions of the at least one further data visualization window are retained when it is arranged.

In one advantageous embodiment of the invention, the size of the additional data visualization window is matched to that of the rectangular area in which it has been placed.

In another advantageous embodiment of the invention, calculation of the optimization variable also involves taking into account the original distance between the additional data visualization window and the rectangular areas.

In another advantageous embodiment of the invention, the list is checked to determine whether at least one rectangular area included therein is of a minimum size.

BRIEF DESCRIPTION OF THE DRAWINGS

To explain the invention further,

FIG. 1 shows a flowchart of the sequence of an exemplary embodiment of the invention.

DETAILED DESCRIPTION OF THE PREFERRED EMBODIMENTS

As shown in FIG. 1—when an additional data visualization window needs to be arranged in an optimum fashion next to an existing data visualization window on the display area of a monitor in a data processing installation—a start command "Start" first causes the free rectangular areas An next to the one data visualization window to be calculated and to be stored in a list L1. The list L1 is then checked to determine whether the number of free rectangular areas An ascertained is greater than zero, i.e. whether there are actually any free rectangular areas next to the already existing first data visualization window. If this is not the case, the operation is terminated.

If, by contrast, the list L1 includes at least one free, unused rectangular area An next to the first data visualization window on the display area of the monitor, then a next method involves checking whether the at least one rectangular area An from the list L1 is of a minimum size Fmin. If this is not the case, the method is terminated.

If, by contrast, at least one free, unused rectangular area An has an area with the minimum size Fmin, the free rectangular areas An are sorted using an optimization variable Q in the list L1 to obtain a derived list L2. In this case, the optimization variable Q is dependent on the area size and on the quotient comprising the aspect ratio of the respective free rectangular area and the aspect ratio of the additional data visualization window. In addition, calculation of the optimization variable Q involves determining how close the respective rectangular area An is to the current position of the further data visualization window which is to be positioned. The free, unused rectangular area having the highest optimization variable is in first position in the derived list L2.

A subsequent method involves checking whether the additional data visualization window is already at the position of the rectangular area having the greatest quality factor Q. If this is not the case, the further data visualization window is positioned at the position of the rectangular area having the highest quality factor, and its size is adjusted to the rectangular area. Otherwise, the window is placed at the position of the area having the second best quality factor.

The invention claimed is:

1. A method for displaying at least two data visualization windows on a display area of a monitor in a data processing installation operated within window applications, the method comprising:

displaying at least one existing data visualization window on said display area of said monitor;

displaying at least one additional data visualization window on said display area of said monitor, the at least one additional data visualization window having a prescribed area size and an aspect ratio; and optimizing the position of the at least one additional data visualization window in response to a start command without changing the location of the existing data visualization window whereby the following steps are carried out;

ascertaining free rectangular areas on said display area, wherein a free rectangular area is such an area that is situated outside the at least one existing data visualization window, storing the ascertained free rectangular areas with characteristic data in a list;

sorting the free rectangular areas by assessing the characteristic data using an optimization variable which is calculated based on an area size and an aspect ratio of the free rectangular areas with respect to the aspect ratio of the at least one additional data visualization window, and producing a derived list; and placing the at least one additional data visualization window without overlap next to the existing data visualization area in the rectangular area shown with priority in the derived list.

2. The method as claimed in claim 1, wherein the size of the additional data visualization window is matched to a rectangular area in which it has been placed.

3. The method as claimed in claim 2, wherein calculation of the optimization variable takes into account a distance between the additional data visualization window and the free rectangular areas.

4. The method as claimed in claim 1, wherein calculation of the optimization variable takes into account a distance between the additional data visualization window and the free rectangular areas.

5. The method as claimed in claim 1, wherein the list is checked to determine whether at least one rectangular area included therein is a minimum size.

* * * * *